March 19, 1963 K. J. SKVORC 3,081,486
MOLDING APPARATUS
Filed May 9, 1960 2 Sheets-Sheet 1

INVENTOR.
Kasimir J. Skvorc
BY
Mueller & Aichele
Attys.

March 19, 1963 K. J. SKVORC 3,081,486
MOLDING APPARATUS
Filed May 9, 1960 2 Sheets-Sheet 2
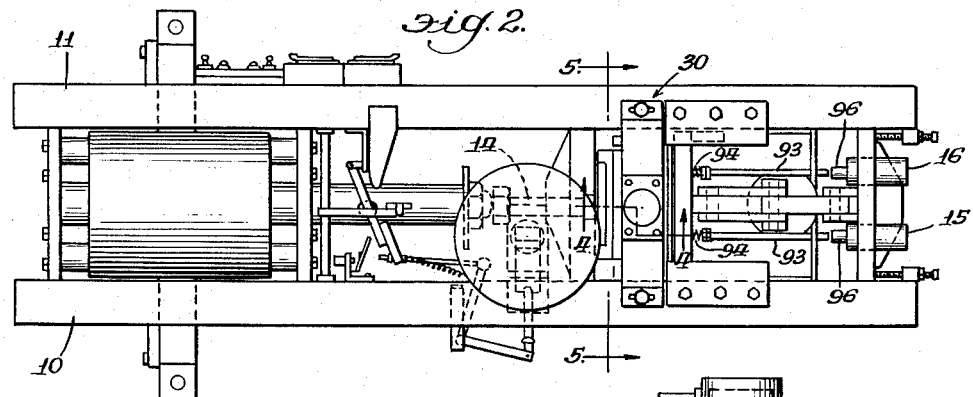
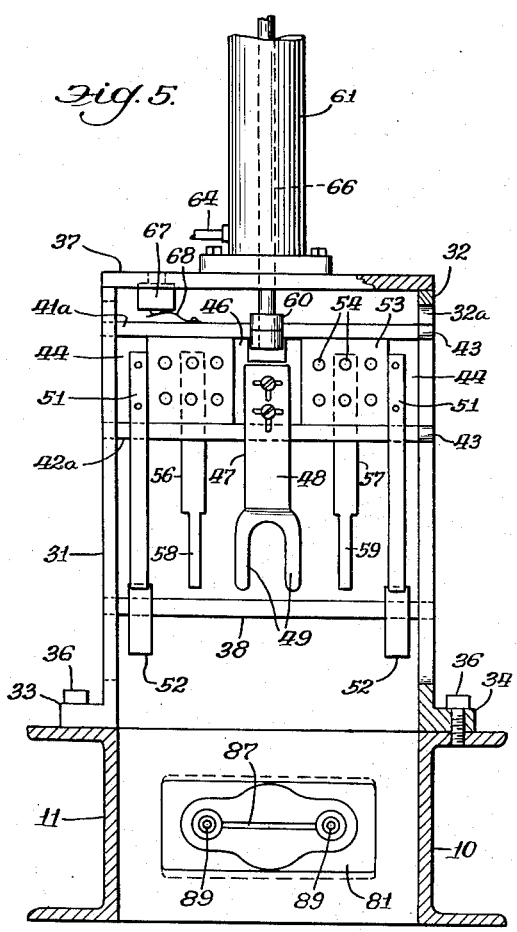
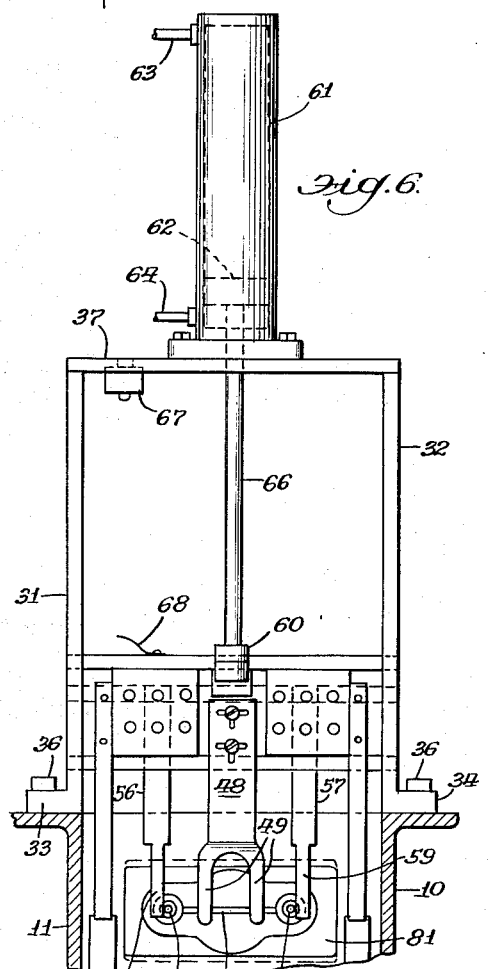
INVENTOR.
Kasimir J. Skvorc
BY Mueller & Aichele
Attys — # United States Patent Office 3,081,486
Patented Mar. 19, 1963

3,081,486
MOLDING APPARATUS
Kasimir J. Skvorc, Westchester, Ill., assignor to Ralph M. Hill and Gordon E. Gray, La Grange, Ill., a partnership
Filed May 9, 1960, Ser. No. 27,710
7 Claims. (Cl. 18—2)

This invention relates generally to molding machines, and more particularly to an improved kickoff mechanism for automatically removing molded objects from the mold blocks of such machines.

Reference is made to United States Patent No. 2,675,583 issued to George A. Scherry and assigned to the assignee herein, which discloses and claims an automatic molding machine for producing plastic objects. The present invention relates to an improvement in the mechanism for removing molded objects from between the opened mold blocks in molding machines such as disclosed in that patent.

In some cases molded objects may be stuck to the knockout pins, or to the opposite side of the mold when it is opened, in a position not easily reached by the kickoff fingers. Automatic molding machines are most efficient when only one operator is required to tend a bank of say six or more machines, including the changing of the molds. Therefore, if a positive mechanism is provided for insuring automatic removal of all portions of each molded part, whether it be broken or otherwise lodged on one or both sides of the opened mold, down time and mold damage per machine can be reduced with a consequent saving in man-hour and mold costs. It is also preferable to provide kickoff fingers which eject the molded parts in the direction which the parts are normally removed. In addition, the fingers should be controllable to operate at a desired point in the operation of the molding machine, which may be different for different objects.

Accordingly, it is an object of the present invention to provide a molding machine having an improved kickoff mechanism for reliably removing molded objects therefrom.

Another object of the invention is to provide an improved kickoff mechanism which is mountable on the top of the molding machine so as to impart downward motion to the molded objects as they are removed from the mold blocks.

A further object is to provide an improved and simplified kickoff mechanism which, by positive and automatic action, removes molded objects from a molding machine regardless of the particular side of the mold to which the object remains stuck.

Still another object of this invention is to provide an improved kickoff mechanism for automatically removing molded objects from an automatic plastic molding machine which is controllable with respect to the path and rate of movement of its kickoff fingers, and easily adjustable with respect to the location and number of such fingers mounted thereon.

A feature of the invention is the provision of a molding machine having fixed and movable molds forming a mold cavity therebetween, with an automatic kickoff mechanism mounted on the machine above the void between the separated molds. Double sets of kickoff fingers may be mounted in the kickoff mechanism to clear both mold faces at the appropriate time in the molding cycle of the machine.

Another feature is the provision of an automatic kickoff mechanism including a movable carriage assembly which supports spaced kickoff fingers and which is guided in its reciprocating movement by cam slots shaped so as to impart any of various desired movements to the fingers.

Still another feature of the invention is the provision of a kickoff mechanism including a guided carriage which may carry mounting blocks adapted to mount various shapes and sizes of kickoff fingers in a plurality of positions depending upon the characteristics and configuration of the molded objects to be removed from the machine. The carriage may also support switch means and safety blocks which operate to prevent closure of the molds while the kickoff fingers are disposed therebetween.

In the accompanying drawings:

FIG. 2 is a top plan view of the machine;

FIG. 5 is an elevational view of the kickoff mechanism with the kickoff fingers in their raised position, taken in section on line 5—5 of FIG. 2; and FIG. 6 is an elevational view of the kickoff mechanism as in FIG. 5 illustrating the kickoff fingers in their lowest position.

The invention provides an automatic molding machine having an improved automatic kickoff mechanism, mounted above the void created when the mold assembly is opened. This mechanism may be synchronized with the machine molding cycle to rapidly remove molded objects which remain stuck to either side of the mold assembly. The kickoff mechanism includes a frame which supports a movable carriage reciprocally actuated by an air cylinder mounted on top of the frame. Guiding means, such as shaped vertical slots, are provided in the sides of the frame so that various shaped kickoff tools adjustably mounted on the carriage may move in predetermined paths best suited for engagement with the particular objects being molded. Safety devices, such as safety blocks carried by the carriage and switch means operable by the reciprocal motion thereof, prevent improper closure of the mold assembly. Knockout pins provided in the mold assembly are adjustably positioned by air cylinders to safely free the molded object from the mold faces and hold the same in a predetermined position for engagement with the kickoff tools.

Figure 1:
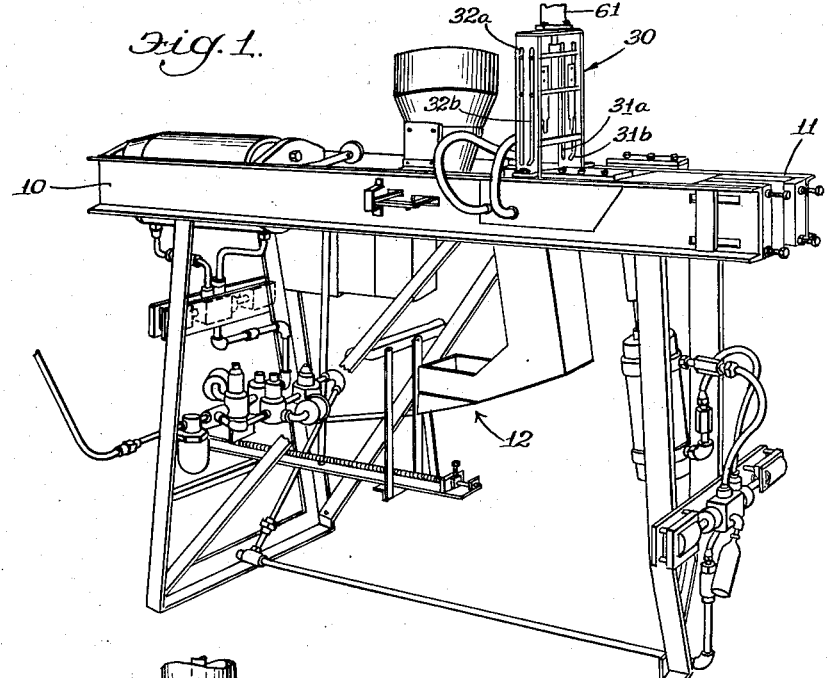
FIG. 1 is a perspective view of an automatic molding machine which embodies the kickoff mechanism of the present invention.

The molding machine illustrated in FIG. 1 is of the type disclosed and illustrated in the aforementioned patent. Briefly, this molding machine is especially adapted to the rapid and automatic molding of thermosetting plastic materials which are provided in powdered or granular form, and which are molded by the application of heat and pressure. The entire press, including the mold, the mold set, transfer cylinder and associated parts is arranged on a horizontal axis between a pair of spaced parallel rails 10 and 11 so that the charge is fed horizontally into the mold, and the finished pieces (FIG. 3) are delivered by gravity from the mold into a weighing mechanism 12 disposed beneath the machine.

In the automatic operation of the molding machine a transfer piston or plunger 13 (FIG. 4) works within a transfer cylinder 14 to intermittently feed charges of molding powder to the heated mold. When the mold is closed, the piston forces the charge through the cylinder into the mold and exerts relatively large pressure thereon so that the powder liquifies, flows into and fills the cavity, and then sets. As the mold opens, knockout pins 89 engage air cylinders 15 and 16 and hold the molded piece or pieces clear of the movable mold block.

An automatic kickoff mechanism 30 in accordance with the present invention then removes the work from the knockout pins, whereupon the work falls into the weighing mechanism. As shown in FIG. 2, kickoff mechanism 30 is mounted upright on rails 10 and 11, transverse thereto and over the mold blocks.

Figure 4:
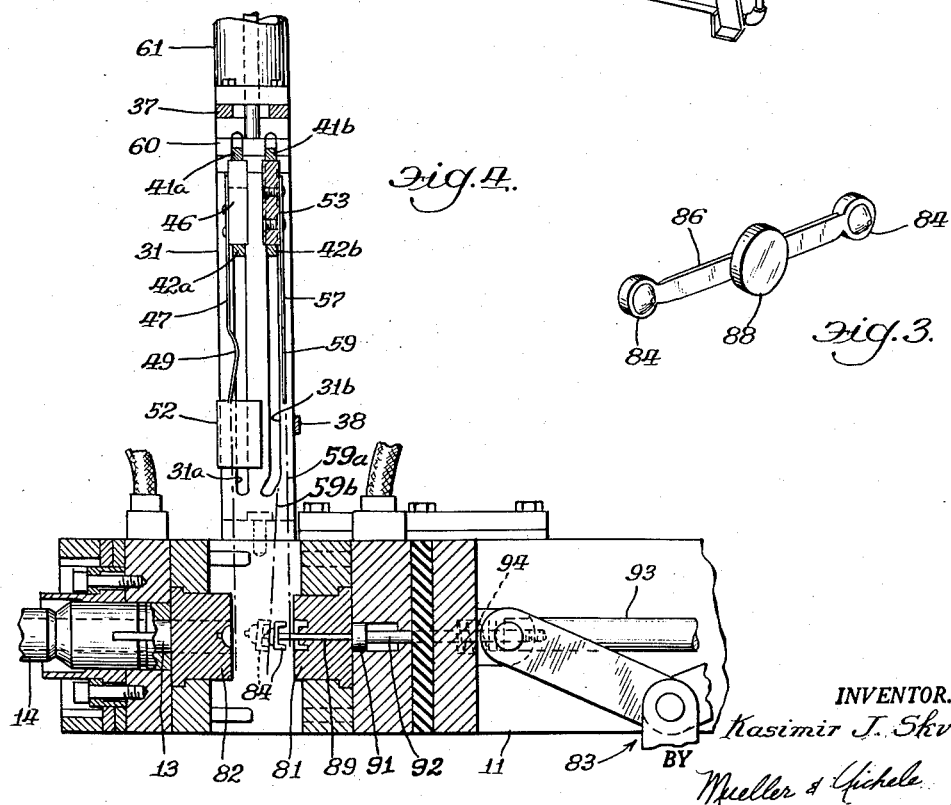
FIG. 4 is a cross section view of the kickoff mechanism and a portion of the machine taken in section on the line 4—4 of FIG. 2.

The structural details of the kickoff mechanism itself are best seen in FIGS. 4–6. A stationary frame assembly houses and supports the moving parts of the mechanism. The frame includes a pair of parallel and spaced apart side plates 31 and 32 having respective mounitng lug portions 33 and 34 at their lower ends which receive mounting bolts 36 for fastening the frame in a vertical position on horizontal rails 10 and 11. The side plates are braced and held in parallel alignment at their upper ends by a top plate 37 and may be further strengthened by other bracing members such as the horizontal member 38 which spans the frame assembly and is fastened to the outer edges of the side plates.

Each side plate is provided with guiding means such as a pair of shaped slots 31a, 31b, 32a, and 32b cut therethrough (FIGS. 1 and 4). These slots may be disposed parallel to one another, and are aligned with their corresponding slot in the opposite side plate. In the disclosed embodiment one pair of opposing slots 31b and 32b are shaped to have a slanted portion at their lower ends, at a predetermined angle of, for example, 30 degrees to the vertical.

A two-section movable carriage assembly is housed within and movably supported by the frame assembly. These sections are vertically disposed side-by-side and include two pairs of identical cross members 41a and 42a, and 41b and 42b, which span the frame assembly and terminate respectively in slots 31a and 31b, and 32a and 32b. The ends of each cross member are cylindrically shaped to form bearing portions 43 (FIG. 5) of a proper diameter to provide an accurate sliding fit of the cross members in the respective slots, and to be guided by the edges forming the slots. In one of the sections cross members 41a and 42a support a pair of mounting blocks 44 adjacent each side plate and also a centrally located mounting block 46. These blocks are adapted to support various elongated members mounted dependently therefrom. Thus, in the case of block 46, a kickoff finger or tool 47 is flush mounted against block 46 by mounting screws or other suitable fastening means.

A flat shank portion 48 of tool 47 may be slotted for vertical or lateral adjustment to facilitate positioning of shaped extremities or finger portions 49 of the kickoff tool. Blocks 44 at the sides of this section of the carriage also support dependent arms 51 having spacer blocks 52 secured to their lower ends.

The opposite vertical section of the carriage assembly supports a mounting block 53 which spans the entire distance between the side panels of the frame assembly. Block 53 is provided with a plurality of mounting holes 54 arranged in two horizontal rows or in other suitable fashion for mounting a plurality of kickoff fingers such as the pair of kickoff tools 56 and 57 dependently mounted thereon. Each of these kickoff tools, like tool 47, has a flat shank portion adapted for adjustable mounting on block 53, with shaped finger portions 58 and 59 respectively dependent therefrom.

The two vertical sections of the carriage assembly may be connected together to slide as one unit by means of a bridging member, such as split yoke 60, through which the upper cross members are inserted.

An actuating mechanism which includes a vertically disposed air cylinder 61 is supported by the frame assembly by bolting cylinder 61 to top plate 37. A piston 62 (FIG. 6) works vertically in air cylinder 61 with a double action provided by compressed air alternately entering and exhausting through inlet lines 63 and 64 located at the upper and lower ends of the air cylinder. These lines may be connected to a source of compressed air through a suitable valve mechanism operated by conventional controls associated with the control mechanism of the molding machine. In the described embodiment, the source of compressed air for the molding machine is used to drive piston 62. Driving connection between the actuating mechanism and the carriage assembly is provided by a piston rod 66 interconnecting piston 62 and yoke 60 through a suitable hole provided in top plate 37.

The reciprocal motion of the carriage assembly in the frame operates a microswitch 67, mounted on the underside of top plate 37 so as to engage a spring arm 68 mounted on the upper surface of one of the cross members of the carriage assembly.

Figure 3:
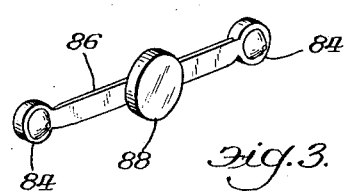
FIG. 3 is an enlarged perspective view of a molded object produced by the machine.

The operation of the kickoff mechanism is synchronized with the operating cycle of the molding machine, which cycle is only briefly described hereafter. Thus, during the portion of the cycle when the movable mold block 81 is engaged with the fixed mold block 82, the carriage assembly is held by piston 62 in the raised position of FIG. 5. At the end of the molding cycle the movable mold block 81 is retracted by means of a toggle linkage 83 so that the molded member may be removed from the mold. A molded object such as would be constructed by the illustrated mold blocks is shown in FIG. 3. The molded pieces 84 are joined by a runner 86 which is formed in the recess 87 of mold block 81. A slug 88 also remains joined to the molded pieces at the center of runner 86 due to the residue of powder formed in the end of the transfer cylinder. When the movable mold block 81 is retracted, piston 13 of the molding machine follows the movement for a short distance so that the slug 88 is forced out of the transfer cylinder and the entire molded object is ejected from fixed mold block 82.

The molded object will normally stick to the movable mold block 81. As more fully described in the aforementioned patent, knockout or ejector pins 89 are provided as part of the automatic molding machine for removing the molded object from the movable mold block 81, pushing the molded object off the mold block as shown in FIG. 4. Each knockout pin 89 is carried by a head 91 provided on a rod 92 which is threadably received in an extension rod 93. A compression spring 94 is operable to bias extension rod 93 away from mold block 81 so that pin 89 is normally held in its fully retracted position when the mold blocks are closed.

The extension rods 93 are spaced at their free outer ends from the movable stop portions 96 of air cylinders 15 and 16 (FIG. 2). The air cylinders and/or rods 93 may be easily adjusted to set the spacing therebetween, this adjustment accurately determining the point in the mold opening cycle at which pins 89 are held fixed relative to rail 11 to thereby push the molded object away from block 81 while mold block 81 continues its movement away from block 82. The air cylinders thus serve as positive stops for pins 89 to provide full ejection force at any desired point of contact, yet they may be overcome as the mold operates further and head 91 reaches mold block 81 in order to prevent damage thereto. The ejection is preferably set to occur after piston 13 has completed its movement towards block 81 to prevent the knockout pins from bending the molded object back upon slug 88.

It has been found necessary in many cases to provide additional means for completely freeing the molded object from the molds since the molded obejct may stick to the knockout pins, or to the end of the transfer cylinder. As sometimes happens, the part may break into two or more pieces so that both sides of the mold assembly are clogged.

The kickoff mechanism is mounted with the frame assembly above the void between the separated mold blocks so that kickoff finger or tool 47 is vertically aligned with the parting face of fixed mold block 82. Likewise, kickoff fingers or tools 56 and 57 are mounted on the opposite side of the carriage assembly, vertically aligned with the open position of the parting face of movable mold block 81. It is to be understood that the spacing between slots 31a and 31b, and that between the corresponding slots in the other side plate, is thus determined by the separation between the opened mold blocks. Normally this spacing will not be altered for any given mold design. However, when it becomes necessary to employ several mold setups it is then an easy matter to provide a predesigned assortment of side plates having slots therein with the requisite spacing to accommodate the various changes in the molding machine setup.

In operation of the kickoff mechanism, the control means associated with the molding machine timing control system controls the air supply to air cylinder 61 and causes the carriage assembly to move rapidly to its lowered position, as shown in FIG. 6. This drops the kickoff tools into the void between the separated mold blocks in a travel path adjacent the parting faces of the mold blocks. The finger portions 49, 58 and 59 of the kickoff tools are shaped according to the configuration of the molded object and may be construtced of material, such as brass or plastic, which is softer or more malleable than the tool steel of the mold blocks so as not to injure the faces of the mold blocks if engagement therewith should take place. If the molded object or a portion thereof is stuck to the end of the transfer cylinder, the ends of the shaped fingers 49 engage runner portions 86 and knock the molded object loose, imparting a downward motion to the molded piece to hasten its descent into the chute and weighing pan.

Should the molded object or a portion thereof be stuck to the knockout pins, it will be removed by kickoff tools 56 and 57 mounted on the opposite section of the carriage assembly. To achieve such removal finger portions 58 and 59 first move downward between the parting face of mold block 81 and the molded object resting on the knockout pins, as indicated by the dash-dot line 59a (FIG. 4). Then, due to the angled portions at the bottom of shaped slots 31b and 32b, the cross member 42b sliding therein moves slightly to the left at the end of the downward stroke of the carriage assembly. This motion carries kickoff tools 56 and 57 to the final position indicated by the dash-dot line 59b, thus shoving the molded object off the ends of the knockout pins 89 and also imparting a downward motion thereto. The carriage assembly is then automatically returned to the raised position by piston 62 being forced upward in air cylinder 61.

The kickoff mechanism is readily adapted to embody one or more safety mechanisms. Thus safety blocks 52 suspended near side plates 31 and 32 drop with the carriage assembly into the void on either side of the opened mold blocks. If a malfunction occurs in the cycling of the molding machine while the kickoff mechanism is in the lower position, these blocks will prevent the mold blocks from engaging and causing damage either to the kickoff mechanism or to the mold blocks. Also, microswitch 67 is opened by the downward movement of the carriage assembly so as to prevent further operation of the mold cycle until the switch is again closed by the raised carriage assembly.

The kickoff mechanism of the invention may be readily varied to operate with a variety of molding setups. Depending upon the configuration of the molded object, the travel paths of either or both mounting blocks 46 and 53 can be altered to impart various motions to the kickoff tools as determined by the shaping of the slots in the side plates. A separate set of side plates can thus be designed and stored for each part to be molded. Since the side plates are an inexpensive portion of the kickoff mechanism, adaptability is achieved at relatively low cost. It is also to be noted that travel paths can be made to best conform with a minimum separation between opened molds, and with the travel of one or both mold blocks. For example, if the slots are closely spaced for the upper portion of carriage travel and then widened near the bottom, the fingers will enter the void between the molds closely spaced and will then fan out to engage the molded object. The optimum length of travel of the carriage can be determined as desired by the length of the slots cut in the side plates. Additional adjustability is easily achieved by varying the mounted positions of the kickoff tools on the universal mounting block 53. The finger portions of the kickoff tools can also be shaped as desired. Preferably, finger portions 49 of tool 47 are made like the curved tines of a fork to form a yoke which fits over and around slug portion 88 of the molded object so as to engage and pry the runner portions 86 away from mold block 82.

While the particular kickoff mechanism described above is actuated by an air cylinder assembly, it is to be understood that such may be replaced by other suitable moving means. However, this particular actuating mechanism is preferred when the kickoff mechanism is used in conjunction with the molding machine herein described, since a source of compressed air is conveniently available and control mechanisms for the molding machine may be readily adapted to operate the kickoff mechanism. Moreover, the timing and rate of movement of an air cylinder mechanism can be accurately controlled in both directions of movement to facilitate rapid synchronization of the kickoff mechanism with the molding cycle of the automatic molding machine.

I claim:

1. A kickoff mechanism for an automatic molding machine having a pair of mold blocks, one of which is movable to open the mold and having a knockout pin for removing a molded object therefrom, including in combination, a frame having a pair of spaced side members each with spaced guide means formed therealong, carriage means movably supported by said guide means, actuating means connected to said carriage means to cause reciprocal movement thereof between first and second positions along said guide means of said frame, finger means and safety block means adjustably supported by said carriage means, said safety block means being shaped and mounted to extend between the mold blocks of the molding machine in the second position of said carriage means to prevent closing of the mold blocks, with said guide means causing said finger means to travel in a predetermined path whereby said finger means enters between the parting face of the movable mold block and an object removed therefrom by the knockout pin and moves away from the parting face to engage and free the molded object therefrom.

2. In a molding machine, the combination including, a first mold block assembly with a parting face, a second movable mold block assembly having a parting face adapted to engage said parting face of said first mold block assembly, said mold block assemblies providing a cavity therebetween for molding an object therein, with the cavity being closed when said parting faces are in engagement and being open when said second mold assembly is moved a predetermined distance away from said first mold block assembly, knockout means having elements positioned in said second mold block assembly and adapted to move into said cavity, said knockout means also having actuating means extending from and movable with said second mold block assembly in the direction away from said first mold block assembly and being biased to retract said elements of said knockout means from said cavity, air cylinder means mounted on said molding machine and having movable stop means extending therefrom in alignment with but spaced from said actuating means, said stop means engaging said actuating means at a predetermined point in its movement as said cavity is opened and causing said elements of said knockout means to move positively into said cavity to engage the molded object and free it from said parting face of said second mold block assembly, said stop means yielding when movement of said elements of said knockout means into said cavity is limited by said second mold block assembly, kickoff means mounted on said molding machine and including a frame having a pair of spaced side members each with spaced guide means formed therealong in general alignment with said parting faces in the open condition thereof, carriage means movably supported by said guide means, operating means connected to said carriage and synchronized with the movement of said second mold block assembly to cause movement of said carriage between first and second positions in said frame, finger means carried by said carriage means, said finger means in the second position of said carriage means extending between said mold block assemblies in their open condition, with said guide means causing said finger means to travel in a predetermined path whereby said finger means enter the space between said parting faces to engage and kick off a molded object from said elements of said knockout means.

3. In a horizontal transfer molding machine having a first fixed mold block assembly with a substantially vertical parting face, a second movable mold block assembly having a substantially vertical parting face adapted to engage said parting face of said first mold block assembly, said first and second mold block assemblies providing a cavity therebetween for molding a plastic object therein with the cavity being closed when said parting faces are in engagement and being open when said second mold assembly is moved a predetermined distance away from said first mold block assembly, the combination therewith of a kickoff mechanism mounted on said machine over the closed position of said second movable mold block assembly, said kickoff mechanism including: a frame assembly having spaced side plates adapted for vertical mounting on said machine and each having first and second shaped slots therein, with said respective first slots and said respective second slots being aligned; a carriage assembly including first and second pairs of spaced apart cross members spanning said frame assembly and having end portions fitted to said first and second slots respectively for sliding movement therein, first and second mounting block means supported respectively by said first and second pairs of cross members, first and second kickoff finger means adjustably and dependently mounted respectively on said first and second mounting block means; actuating means mounted on said frame assembly and connected to said carriage assembly to cause reciprocal sliding motion thereof between raised and lowered positions; and control means for operating said actuating means whereby said first and second finger means move downwardly in a path determined by said shaped slots into the space between said mold block assemblies when the mold is open and adjacent the respective parting faces thereof so that at least one of said finger means engages said plastic object to kickoff the same from said open mold block assemblies in the lowered position of said carriage assembly, said carriage assembly returning to the raised position to clear said finger means from the engagement of said mold block assemblies.

4. A kickoff mechanism for removing molded objects from an automatic molding machine, including in combination a vertical frame assembly including two parallel elongated side plates, each of said side plates having first and second vertically extending shaped slots therein, bracing means spacing said side plates apart with said first and second slots being respectively aligned with each other, said bracing means including a top plate connecting the upper ends of said side plates, said side plates having footing portions at the lower ends thereof adapted for mounting said kickoff mechanism on the automatic molding machine with said first and second slots generally aligned with the parting faces of mold blocks of the molding machine in their open condition; a carriage assembly including first and second pairs of spaced apart cross members spanning said frame assembly and having cylindrical end portions disposed in said first and second slots respectively for sliding movement therein, first and second mounting block means supported respectively by said first and second pairs of cross members and having a plurality of threaded mounting holes arranged therein, first and second kickoff tool means having shank portions adapted for adjustable dependent mounting from the mounting holes of said mounting block means and having shaped finger portions extending from said shank portions a predetermined distance, safety means including a pair of spacer blocks dependent from said first pair of cross members a predetermined distance and microswitch means mounted on said carriage assembly and operable by engagement with said top plate to prevent operation of said molding machine when said carriage assembly is in its lower position, and a bridge member coupling said first and second pairs of cross members; actuating means including an air cylinder assembly vertically mounted on said top plate and having a piston therein with a piston rod intercoupling said piston and said bridge member, said air cylinder assembly producing double action of said piston between first and second positions to cause reciprocal sliding motion of said carriage assembly whereby said kickoff tool means are lowered in a path determined by said slots so that said finger portions engage and kickoff the object being molded; and control means for automatically operating said air cylinder assembly in sequence with the molding cycle of the molding machine.

5. A kickoff mechanism for a molding machine having a mold formed by a pair of mold block assemblies each having a parting face and being separable along said parting faces to open the mold, said mechanism including in combination, a frame adapted to be secured to the molding machine and having a pair of elongated guide slots therein, carriage means having portions movably supported in said guide slots, finger means mounted on said carriage means, and operating means connected to said carriage means and synchronized with the separation of said mold block assemblies to cause said finger means to move between the parting faces of said mold block assemblies when separated, said elongated guide slots extending generally parallel to said parting faces of said mold block assemblies and having inner angled ends, said operating means moving said carriage means in said guide slots to cause said finger means to travel in a path along the parting face of one mold block and then away from such face as said portions of said carriage means move in said angled ends of said guide slots.

6. In a molding machine, the combination including first and second mold block assemblies each having a parting face, means supporting said assemblies in closed position to form a cavity therebetween for molding an object therein means for moving one of said assemblies to separate the same along said respective parting faces, knockout means having an element positioned in said first mold block assembly and adapted to engage an object molded in said cavity and free the same from said first mold block assembly, kickoff means mounted on said molding machine and including a frame having elongated guiding edges thereon, carriage means having portions movably engaging said guiding edges, finger means carried by said carriage means, and operating means connected to said carriage means and synchronized with the movement of said mold block assembly to move said carriage means so that said finger means moves between said parting faces of said mold block assemblies when separated, said elongated guiding edges extending generally parallel to said parting faces and having inner angled ends to guide said carriage means so that said finger means moves into the space between said parting faces and along said parting face of said first mold block assembly and then away from such parting face as said portions of said carriage means move along said angled ends of said guiding edges, so that said finger means acts to engage and kickoff a molded object which adheres to said element of said knockout means.

7. A kickoff mechanism for a molding machine having mold formed by a pair of mold blocks with parting faces adapted to be in engagement to close the mold, and adapted to be spaced apart to open the mold, said mechanism including in combination, a frame adapted to be secured to a permanent structural portion of the molding machine and having first and second guiding edges formed therealong, first and second carriage means movably supported for movement along said first and second guiding edges respectively, actuating means connected to said carriage means to cause movement thereof between a first position when the mold is closed and a second position when the mold is open, first and second finger means independent of said actuating means supported by said first and second carriage means respectively, said actuating means moving said first and second means to the second position when the mold is open so that said first and second finger means enter the space between the parting faces of the mold, said first guiding edges being shaped to guide said first carriage means so that said first finger means moves in a path along the parting face of one mold block and then away from such face to kickoff an object adjacent the parting face of the one mold block, and said second guiding edges being shaped to guide said second carriage means so that said second finger means moves along the parting face of the other mold block, said second finger means having a portion shaped to engage an object adjacent the parting face of the other mold block and move the same free of said parting face.

References Cited in the file of this patent

UNITED STATES PATENTS

| | | |
|---|---|---|
| 2,253,651 | Ring | Aug. 26, 1941 |
| 2,739,349 | Strauss | Mar. 27, 1956 |